Feb. 11, 1969    B. B. ISENHOUR    3,426,450
PERCEPTUAL SPEED TESTING DEVICE
Filed Dec. 28, 1966    Sheet 1 of 2
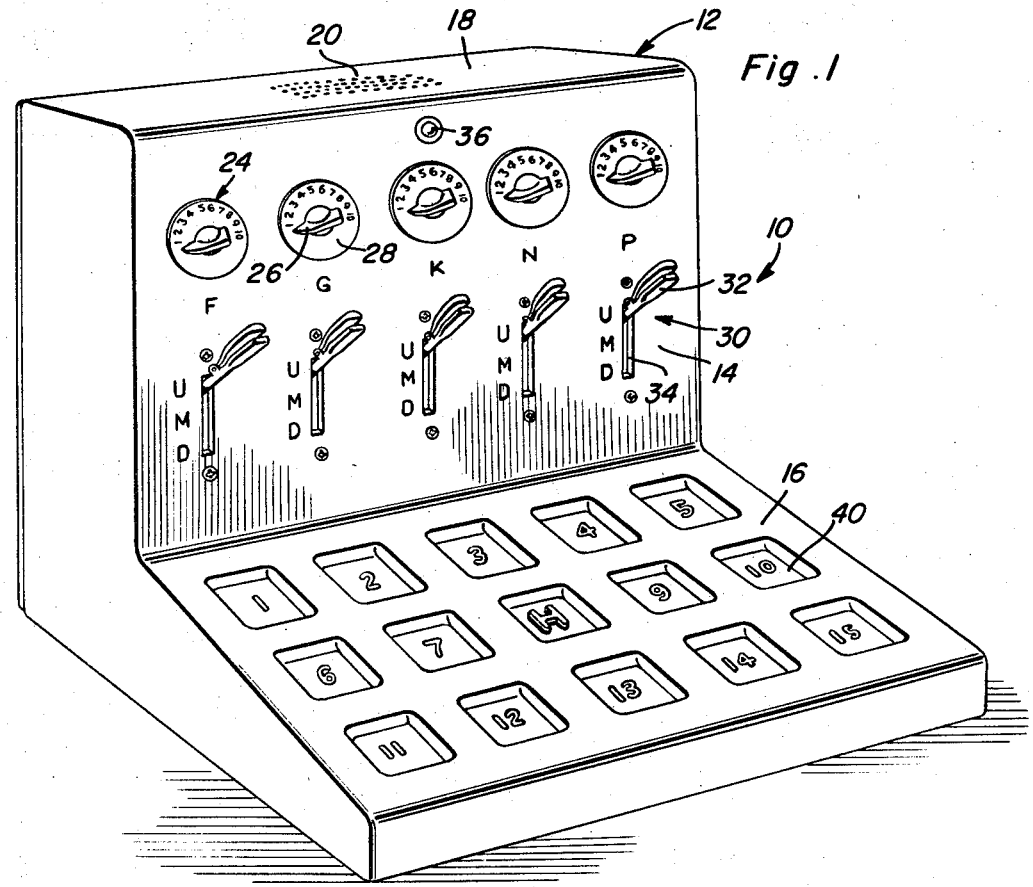
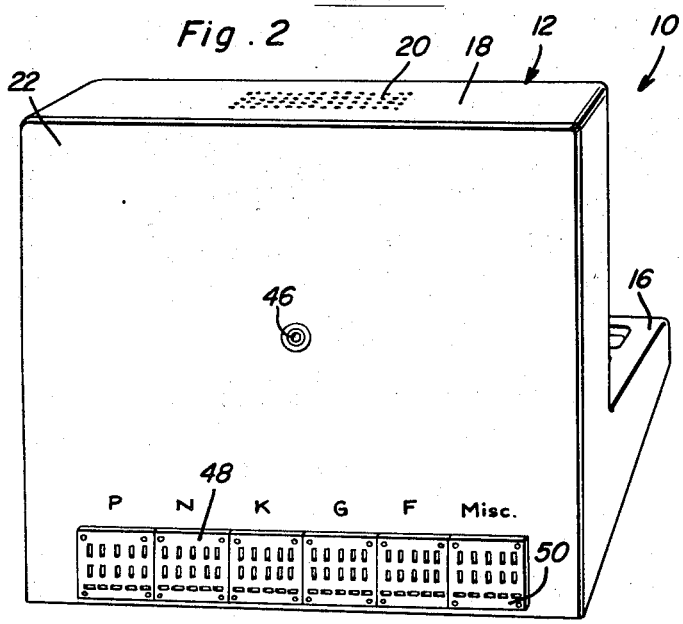
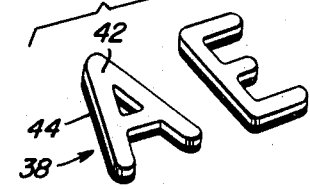
Burthel B. Isenhour
INVENTOR.
BY *Clarence A. O'Brien*
and *Harvey B. Jacobson*
Attorneys Feb. 11, 1969   B. B. ISENHOUR   3,426,450
PERCEPTUAL SPEED TESTING DEVICE
Filed Dec. 28, 1966   Sheet 2 of 2
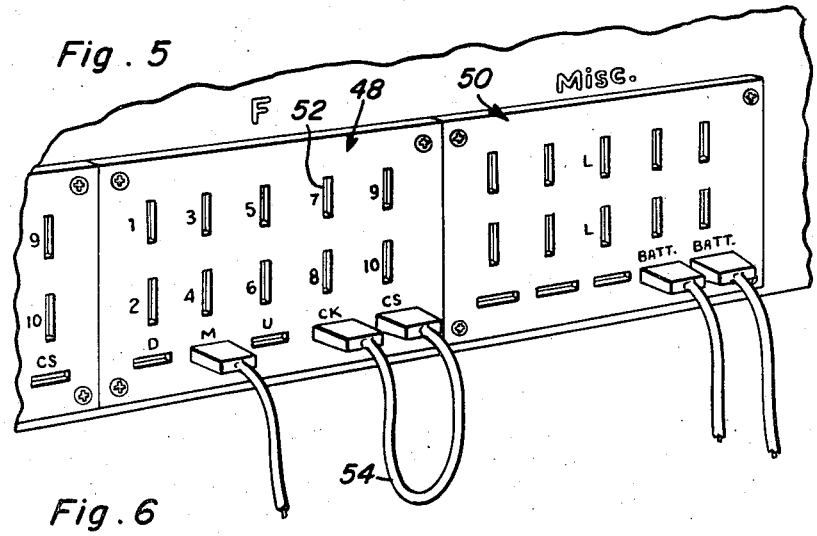
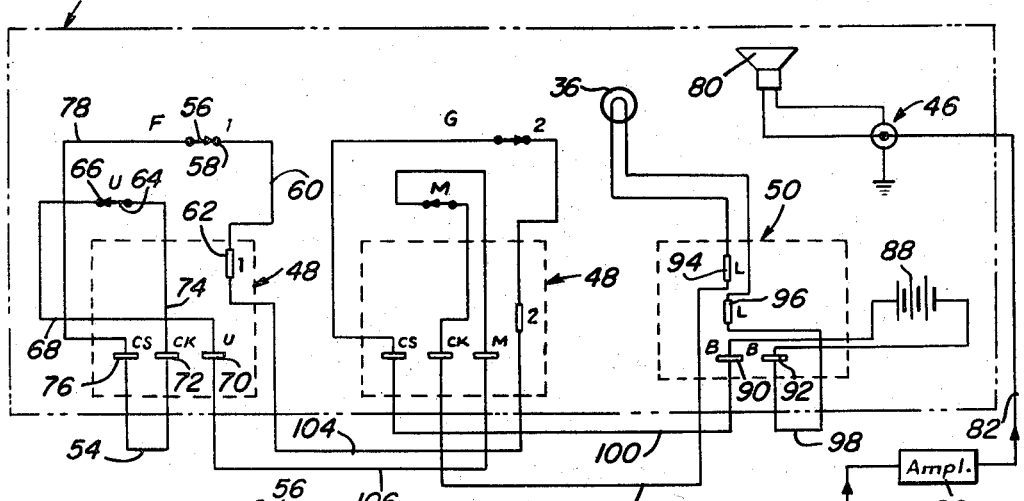
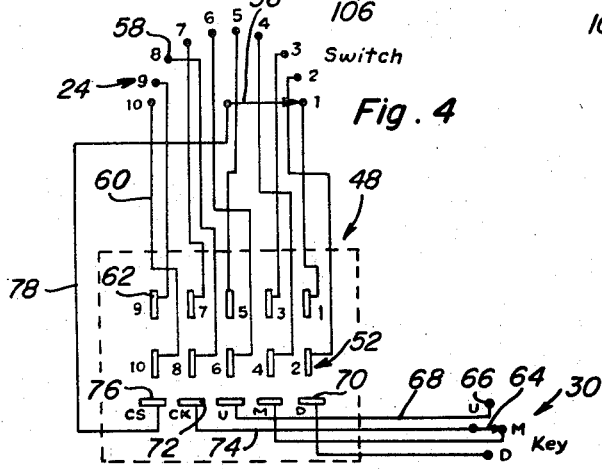
Burthel B. Isenhour
INVENTOR.

United States Patent Office 3,426,450
Patented Feb. 11, 1969

3,426,450
PERCEPTUAL SPEED TESTING DEVICE
Burthel B. Isenhour, New Braunfels, Tex., assignor of sixteen percent to R. B. Isenhour, Del Rio, sixteen percent to J. N. Riggs, San Antonio, and sixteen percent to L. E. Minns, Houston, Tex.
Filed Dec. 28, 1966, Ser. No. 605,313
U.S. Cl. 35—22  5 Claims
Int. Cl. G09b 1/04, 7/02

ABSTRACT OF THE DISCLOSURE

An aptitude testing and training device through which a subject is instructed to position a plurality of rotary and lever operated switches of the multiposition type, in accordance with a prearranged sequence or pattern. Accurate compliance by the subject with instructional commands produces an indication signal. Facilities are provided for changing the test command pattern with which the signal is associated.

Background of the invention

This invention relates to apparatus and method for psychological testing and training of subjects. The present invention is therefore useful in connection with aptitude testing for employment purposes, rehabilitation training and to test or improve mechanical agility and powers of coordination. The apparatus of the present invention is also useful as an educational toy and as a means for remedial exercise.

Psychological testing and training devices heretofore proposed have been quite complex and expensive to construct, maintain and operate. The apparatus of the present invention therefore provides relatively simple facilities for testing and training subjects by establishing an acceptable sequence of manipulative steps to be performed by the subject in response to commands. The test sequence may be changed as desired and made as complex or as simple as desired. The apparatus of the present invention is thereby endowed with a degree of versatility not found in prior art devices.

Summary of the invention

In accordance with the present invention, a plurality of rotary and lever operated switches are provided wired to a plurality of panel patches through which different sequence patterns are established by jumper cables interconnecting the patches. The switches are adapted to be displaced to labelled positions by the subject. When a prearranged sequence of switch positioning steps are followed by the subject, a circuit is completed through an indicator lamp to provide a signal indicating successful completion of the test procedure. Also, the apparatus is provided with a tray portion having labelled recesses adapted to receive insignia such as cutout letters. Placement of the insignia within the recesses is performed by the subject upon command as part of the test procedure.

The test procedure in accordance with the present invention may be made as complex or as simple as possible and changed when desired by means of jumper cables and connector patches to which the switch devices and the indicator lamp are wired. A relatively large number of different combinations is thereby made available from which different test patterns may be selected rendering the apparatus extremely versatile.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Brief description of the drawing

FIGURE 1 is a perspective view of the apparatus showing the front portion thereof.

FIGURE 2 is a perspective view of the apparatus showing the rear portion thereof.

FIGURE 3 is a perspective view showing some of the letter insignias to be utilized in connection with the apparatus and method of the present invention.

FIGURE 4 is an electrical circuit diagram showing a combination of associated rotary switch, lever operated switch and connector patch.

FIGURE 5 is a partial perspective view showing some of the connector patch panels associated with the apparatus of the present invention.

FIGURE 6 is an electrical circuit diagram showing one typical completed circuit establishing a prearranged test procedure pattern.

Description of the preferred embodiment

Referring now to the drawings in detail, FIGURES 1 and 2 illustrate the apparatus of the present invention generally referred to by reference numeral 10. The apparatus comprises a housing 12 having a working panel portion 14 which is disposed in a substantially vertical position. Extending forwardly from the working panel portion 14, is a tray portion 16 disposed at a downward slope from the horizontal. Extending rearwardly from the working panel portion 14 is a top portion 18 within which an opening is formed closed by a speaker grill 20. The rear of the housing is closed by a back panel 22.

The front work panel portion 14 of the housing mounts a plurality of rotary switch devices 24 as shown in FIGURE 1. Each switch device includes a switch positioning knob 26 having a pointer adapted to be aligned with a selected position on a switch dial plate 28, the positions of the switch device being labelled by numbers 1 through 10 in the illustrated embodiment. It will also be observed from FIGURE 1, that there are five rotary switch devices arranged in horizontally spaced relation to each other, each of the switch devices being labelled by a different letter. Underlying each of the rotary switch devices 24, is a correspondingly labelled lever-operated key switch 30. Each key switch includes therefore an actuating arm 32 projecting forwardly from a slot 34 formed in the panel portion 14 limiting displacement of the arm 32 between an up position, a middle position and a down position. Both the rotary switches 24 and the lever-operated switches 30 are to be displaced to certain positions by the subject pursuant to instructional commands.

Also mounted on the front work panel portion 14, is an indicator lamp 36 by means of which successful manipulation of the switch devices 24 and 30 by a subject pursuant to a sequence of commands, will be indicated. The subject will also be instructed to establish a prearranged visual pattern of insignias, such as the letters 38 shown in FIGURE 3, within the recesses 40 formed in the tray portion 16 of the housing. In the illustrated embodiment, 15 recesses 40 are formed in the tray portion and are labelled by numbers 1 through 15. 15 insignia letters 38 are therefore provided, each letter 38 having a white surface 42 on one side thereof and a black surface 44 on the other side thereof. The subject will therefore be instructed to place a specified insignia 38 in one of the numbered recesses 40 with either the white or black side exposed. Thus, the test procedure will involve both the placement of insignias 38 within the recesses 40 of the tray portion and manipulation of the switch devices 24 and 30.

Instructions and commands to the subject may be broadcast by means of a speaker enclosed within the housing 12 aligned below the opening closed by the speaker grill 20. An input to the speaker is therefore connected by means of a jack 46 mounted in the back panel 22 as shown in FIGURE 2. Also mounted on the back panel adjacent the bottom thereof, are a plurality of connector patch panels 48 equal in number to the pairs of switch devices 24 and 30 and labelled to correspond to said pairs of switch devices. A miscellaneous patch panel 50 is also provided for purposes to be explained hereafter. Each of the patch panels is provided with a plurality of plug-in terminal connectors 52 as more clearly seen in FIGURE 5. In the illustrated embodiment, ten vertically aligned connectors 52 are provided for each patch panel and five horizontally aligned connectors. Also associated with the apparatus are a plurality of jumper conductor cables such as cable 54 through which different connector terminals are electrically interconnected externally of the housing in order to establish a selected circuit through which the lamp 36 is energized when a subject successfully completes a plurality of manipulative steps within a predetermined time on commands issued through the speaker associated with the apparatus.

As shown in FIGURE 4, each labelled pair of switch devices 24 and 30 are wired to a correspondingly labelled patch panel 48. The wiper arm 56 connected to the switch knob 26 aforementioned is displaceable between ten operative positions at which it engages one of the ten contacts 58 associated with the switch device 24. Each of the contacts 58 is connected by a conductor 60 to one of the ten vertical terminal connectors 62. The switch arm 32 associated with the lever operated switch device 30 on the other hand displaces a switch element 64 between positions engaging three contacts 66, each contact being electrically connected by a conductor 68 to one of the three horizontally aligned terminal connectors 70. A common terminal connector 72 is also provided and is connected by conductor 74 to the switch element 64 while a terminal connector 76 is connected by conductor 78 to the wiper arm 56 associated with the switch device 24. It will of course be appreciated that each pair of switch devices 24 and 30 and associated patch panel 48 are electrically interconnected in the same manner as described in connection with FIGURE 4.

The wiring which interconnects the switch devices and the patch panels are enclosed within the housing 12. Also enclosed within the housing as shown in FIGURE 6 is the speaker 80 electrically connected to the jack device 46 to which an input is connected from an external source by a conductor 82 for example. The input source may include for example a record playback device 84 and an amplifier 86. Also enclosed within the housing, may be the wiring through which the lamp 36 is connected to the miscellaneous patch panel 50 and to which a source of electrical energy such as the battery 88 is connected. For example, the battery in FIGURE 6 is shown connected across the terminals 90 and 92 while the indicator lamp 36 is connected across the terminals 94 and 96. A jumper wire 98 may therefore interconnect the terminals 92 and 96 externally of the housing through the miscellaneous patch panel 50 while jumper wires 100 and 102 interconnect the terminals 90 and 94 to terminals in the other patch panels 48. In the example illustrated in FIGURE 6, the jumper wire 100 is connected to the common switch terminal associated with the patch panel G while the jumper wire 102 is connected to the common key switch terminal in the same patch panel. Jumper wire 104 externally interconnects the vertical connector terminals 62 in the patch panels F and G while jumper wire 106 interconnects horizontal connector terminals 70 in the patch panels F and G. The jumper wire 54 aforementioned, interconnects the horizontal connector terminals 72 and 76 associated with the patch panel F. An energizing circuit is thereby completed for the indicator lamp 36 when the switch devices 24 and 30 respectively labelled F and G are displaced to the positions illustrated in FIGURE 6.

Through use of a prerecorded input to the speaker 80, a subject may be given instructions on how to follow commands. For example, the command "switch F–1" would signify that the subject should displace the rotary switch device 24 labelled F to the contact position labelled 1 as shown in FIGURE 6. The command "switch G–2" would signify that the subject should displace the rotary switch device labelled G to the contact position numbered 2 also shown in FIGURE 6. The command "key F-up" would signify that the switch device 30 labelled F should be displaced to its upper position as shown in FIGURE 6. The command "key M-middle" would signify displacement of the switch device 30 labelled G to its middle position. Other instructions will also be provided for following commands in connection with the visual pattern formed in the tray portion 16 of the housing 12. For example, the command "white H–8" would signify placement of the insignia H in the recess 40 labelled by number 8 with the white side facing upward as shown in FIGURE 1. It will be appreciated therefore, that a relatively large number of different combinations of commands may be given in accordance with a prearranged pattern resulting in illumination of the indicator lamp 36 and a predetermined visual pattern on the tray portion 16 of the housing if the test procedure is successfully completed by the subject taking the test. The test pattern may be readily changed by means of the external connections established by the jumper wires in order to provide tests that are as simple or as complex as desired.

From the foregoing description, the construction, operation and utility of the apparatus and method of the present invention will be apparent. The tests given by the apparatus of the present invention may be timed and scores recorded for various purposes. The test procedure has also been found to be substantially challenging to subjects and useful in classifying subjects according to reaction to spoken commands, coordination of eyes and hands, concentration, dexterity, vigilance, mental relaxation, memory, fidelity, perceptual speed and accuracy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aptitude testing and training apparatus comprising, a housing having a work panel mounting a plurality of multiposition switch devices and a tray portion having a plurality of labelled recesses adapted to receive insignia therein, a plurality of patch panels mounted on the housing having connector sections adapted to be electrically interconnected by jumper conductors externally of the housing in accordance with a prearranged pattern, an indicator lamp mounted on the work panel, and electrical circuit means connected to the lamp and the connector sections of the patch panels internally of the housing for completing an energizing circuit through the lamp in response to positioning of said switch devices to positions corresponding to the prearranged pattern of the jumper conductors.

2. The combination of claim 1 wherein said switch devices includes one group of rotary switches and another group of lever operated switches, each of the patch panels being wired by the circuit means to one of the switches of said one group and one of the switches of the other group, and a source of electrical energy connected to said circuit means.

3. The combination of claim 2 wherein said apparatus further includes a speaker, and a connector device connected to the speaker for supplying an instructional audio input to the speaker.

4. The combination of claim 1 wherein said apparatus further includes a speaker, and a connector device connected to the speaker for supplying an instructional audio input to the speaker.

5. An aptitude testing and training apparatus comprising, a housing having a work panel mounting a plurality of multiposition switch devices, a plurality of patch panels mounted on the housing having connector sections adapted to be electrically interconnected by jumper conductors externally of the housing in accordance with a prearranged pattern, an indicator lamp mounted on the work panel, and electrical circuit means connected to the lamp and the connector sections of the patch panels internally of the housing for completing an energizing circuit through the lamp in response to positioning of said switch devices to positions corresponding to the prearranged pattern of the jumper conductors, said switch devices including one group of rotary switches and another group of lever operated switches, each of the patch panels being wired by the circuit means to one of the switches of said one group and one of the switches of the other group, and a source of electrical energy connected to said circuit means.

References Cited

UNITED STATES PATENTS

| | | | |
|---|---|---|---|
| 2,327,194 | 8/1943 | Kopas | 35—22 |
| 2,970,386 | 2/1961 | Knutson | 35—9 |
| 3,146,533 | 9/1964 | Carmody et al. | 35—10 |
| 3,222,597 | 12/1965 | Beatenbough et al. | 35—8 XR |

WILLIAM H. GRIEB, *Primary Examiner.*